United States Patent
Yano et al.

(10) Patent No.: US 9,420,590 B2
(45) Date of Patent: Aug. 16, 2016

(54) MOBILE GATEWAY, CONTROL METHOD FOR THE SAME, AND RADIO ACCESS NETWORK EQUIPPED WITH THE SAME

(71) Applicant: HITACHI, LTD., Tokyo (JP)

(72) Inventors: Masashi Yano, Tokyo (JP); Nodoka Mimura, Tokyo (JP); Naruhito Nakahara, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/447,927

(22) Filed: Jul. 31, 2014

(65) Prior Publication Data

US 2015/0045079 A1 Feb. 12, 2015

(30) Foreign Application Priority Data

Aug. 6, 2013 (JP) .................................. 2013-163125

(51) Int. Cl.
| | |
|---|---|
| *H04B 15/00* | (2006.01) |
| *H04W 72/04* | (2009.01) |
| *H04W 88/16* | (2009.01) |
| *H04W 28/16* | (2009.01) |

(52) U.S. Cl.
CPC .......... *H04W 72/0486* (2013.01); *H04W 28/16* (2013.01); *H04W 88/16* (2013.01)

(58) Field of Classification Search
CPC . H04W 72/0453; H04W 72/04; H04W 16/14; H04W 72/0486; H04W 28/08; H04W 16/10; H04W 52/343; H04W 72/00; H04W 72/0433; H04W 72/044; H04W 72/1242; H04W 72/1252; H04W 72/1257
USPC ............................ 455/450, 451, 452.1, 452.2
See application file for complete search history.

(56) References Cited

U.S. PATENT DOCUMENTS

2012/0014332 A1* 1/2012 Smith .................. H04W 16/14
370/329

FOREIGN PATENT DOCUMENTS

JP 2012-222380 A 11/2012

* cited by examiner

*Primary Examiner* — Tu X Nguyen
(74) *Attorney, Agent, or Firm* — Mattingly & Malur, PC

(57) ABSTRACT

Appropriate bandwidths are allocated to base stations in response to variations in the arrangement of mobile terminals and according to the type of mobile terminals. Mobile gateways disposed between a plurality of base stations connecting a plurality of mobile terminals and a service network include a base station information acquiring unit that acquires communication capacities of the base stations; a mobile terminal information acquiring unit that acquires a communication capacity of each type of the mobile terminals; a communication bandwidth estimating unit that estimates the communication bandwidths of the base stations on the basis of the acquired communication capacities of the base stations and the acquired communication capacities of mobile terminals; and a communication bandwidth control unit that controls communication bandwidths corresponding to the base stations on the basis of the estimated communication bandwidth.

8 Claims, 13 Drawing Sheets

FIG. 5

| 401 BASE STATION ID | 501 NUMBER OF SECTORS | 502 CA FLAG | 503 FREQUENCY BAND 1 | 504 FREQUENCY WIDTH 1 | 505 FREQUENCY BAND 2 | 506 FREQUENCY WIDTH 2 |
|---|---|---|---|---|---|---|
| X | 1 | No | 1 | 10 MHz | 18 | 10 MHz |
| Y | 3 | Yes | 1 | 10 MHz | 18 | 10 MHz |
| ⋮ | ⋮ | ⋮ | ⋮ | ⋮ | ⋮ | ⋮ |

FIG. 6

| 402 TAC | 601 CA FLAG | 602 FREQUENCY BAND 1 | 603 FREQUENCY WIDTH 1 | 604 FREQUENCY BAND 2 | 605 FREQUENCY WIDTH 2 |
|---|---|---|---|---|---|
| a | No | 1 | 1 MHz | 18 | 1 MHz |
| b | Yes | 1 | 2 MHz | 18 | 2 MHz |
| ⋮ | ⋮ | ⋮ | ⋮ | ⋮ | ⋮ |

FIG. 7

| 403 IMSI | 701 IMEI | 702 STATE | 703 BASE STATION ID | 704 SECTOR ID | 705 TAC | 706 MAXIMUM COMMUNICATION BANDWIDTH |
|---|---|---|---|---|---|---|
| 0011 | 3533a | IDLE | — | — | a | 3 Mbps |
| 0012 | 3116b | CONNECTED | X | 0 | b | — |
| ⋮ | ⋮ | ⋮ | ⋮ | ⋮ | ⋮ | ⋮ |

FIG. 8

| 404 | 801 | 802 | 803 | 804 | 805 | 806 |
|---|---|---|---|---|---|---|
| BASE STATION ID | SECTOR ID | FREQUENCY BAND 1 | IN-USE FREQUENCY WIDTH 1 | FREQUENCY BAND 2 | IN-USE FREQUENCY WIDTH 2 | |
| X | 1 | 1 | 5 MHz | 18 | 5 MHz | |
| Y | 3 | 1 | 10 MHz | 18 | 10 MHz | |
| ⋮ | ⋮ | ⋮ | ⋮ | ⋮ | ⋮ | |

FIG. 9

| 405 | 901 | 902 | 903 | 904 |
|---|---|---|---|---|
| BASE STATION ID | COMMUNICATION BANDWIDTH | BASE STATION ADDRESS | QUEUE INFORMATION | |
| X | 75 Mbps | 10.0.10.50 | 623 | |
| Y | 150 Mbps | 10.0.10.60 | 1246 | |
| ⋮ | ⋮ | ⋮ | ⋮ | |

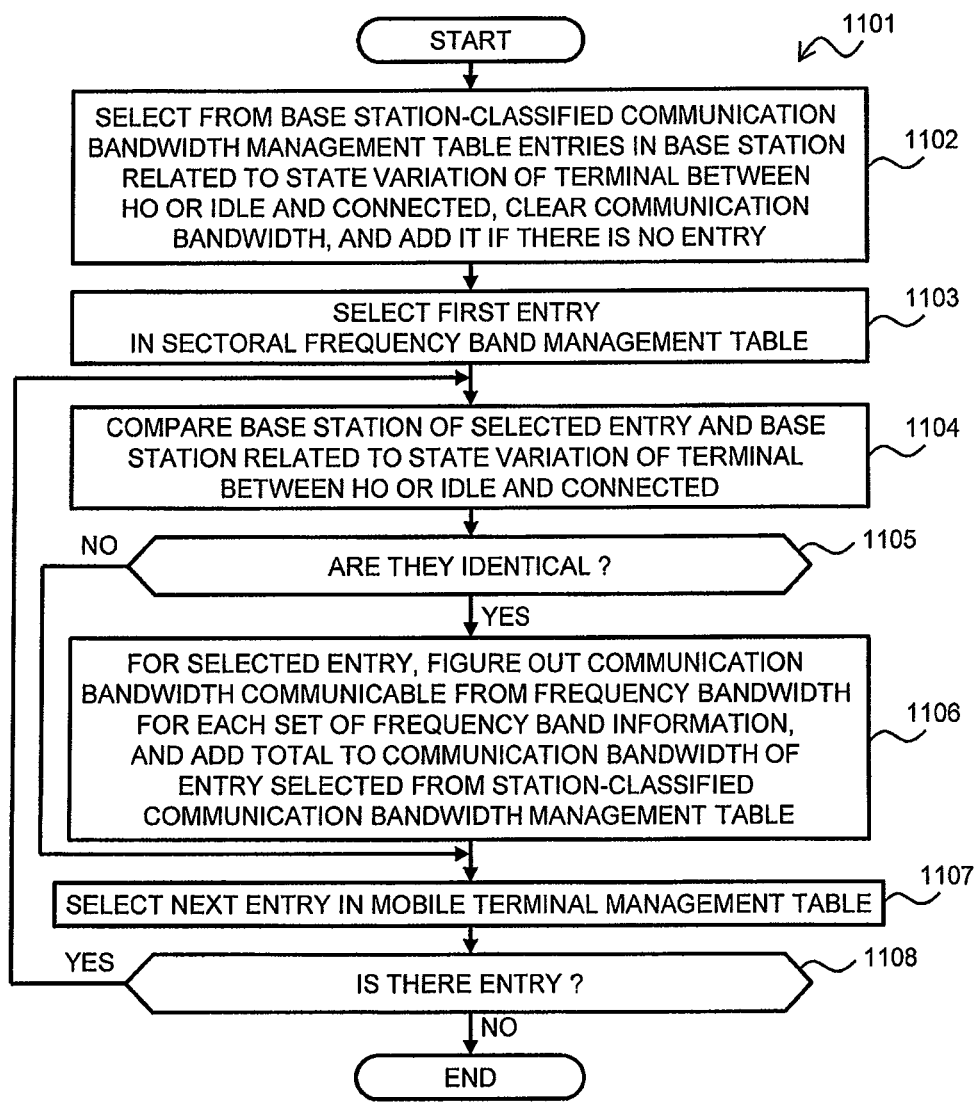
F I G. 11

F I G. 12
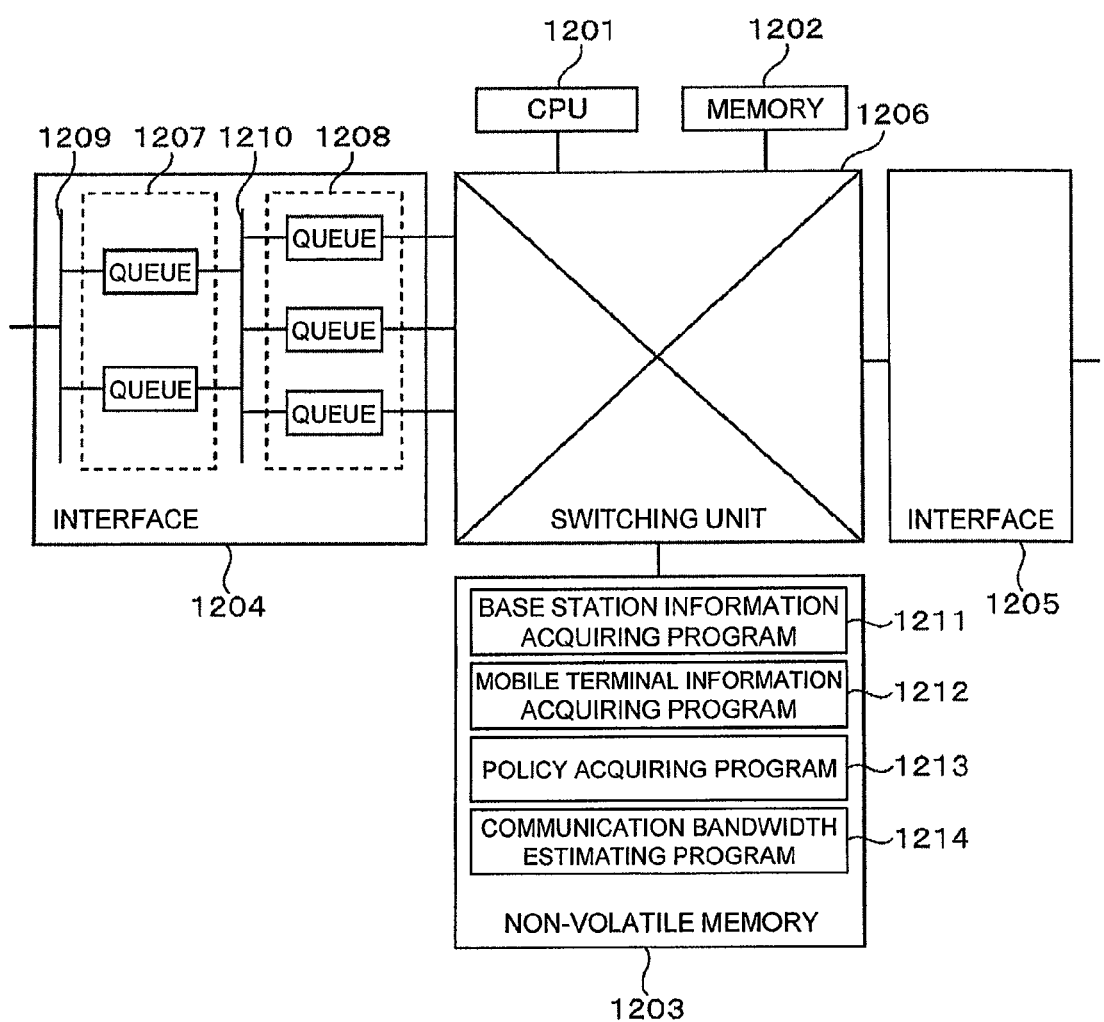

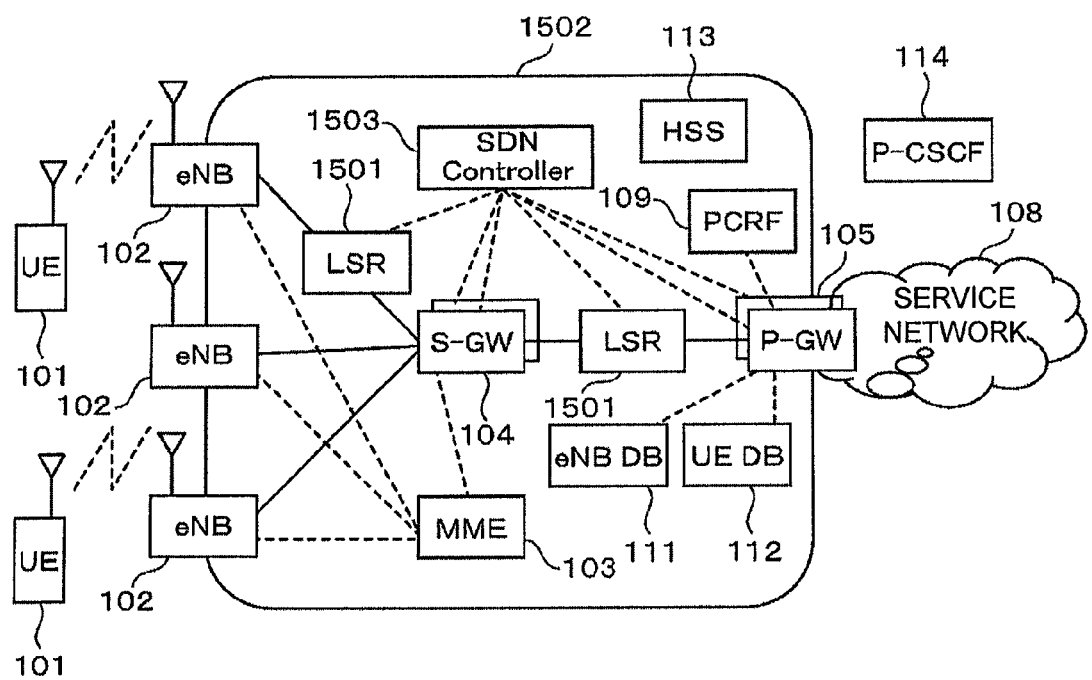
F I G. 15

MOBILE GATEWAY, CONTROL METHOD FOR THE SAME, AND RADIO ACCESS NETWORK EQUIPPED WITH THE SAME

CLAIM OF PRIORITY

The present application claims priority from Japanese application JP 2013-163125 filed on Aug. 6, 2013, the content of which is hereby incorporated by reference into this application.

BACKGROUND OF THE INVENTION

1. Field of the Invention

The present invention relates to mobile gateways disposed between a plurality of base stations connecting a plurality of mobile terminals and a service network, a control method for the gateways and radio access network equipped with the gateways.

2. Background of the Invention

Today, in the field of mobiles communication networks, high-speed (known as 3.9G) mobile broadband lines including Worldwide Interoperability for Microwave Access (WiMAX) and Long Term Evolution (LTE) are in extensive use as further developed versions of 3.5G network services including 3G high-speed data communication services such as HSPA and EV-DO. Furthermore, expansion of the radio frequency bandwidth by carrier aggregation is scheduled for a service known as LTE-Advanced, which would make possible another step ahead in communication speed. In the 3.9G sector, connection of high-performance mobile terminals called Smartphone and personal computers to the Internet via one or another of these mobile broadband lines is becoming a common practice, and the communication speed is more than 100 Mbps in some radio frequency bandwidths.

Along with the expanded use of mobile broadband services, it is also required to raise the access line speed of connections to base stations of the mobile communication network and the network line speed between mobile gateways connected to base stations to accommodate mobile terminals and the base stations.

Meanwhile, along with the increase in mobile broadband speed, the difference in traffic volume between the connected state and the idle state is expanding. At the same time, the number of mobile terminals covered by each base station significantly varies with the time and the installed position. For instance, a base station located in a downtown area handles heavy traffic in the daytime while having scarce traffic from late at night until early in the morning. Conversely, a base station close to a residential area has a heavy traffic load from the evening until late at night. For a mobile broadband system such as WiMAX or LTE, the bandwidth necessary for the communication route to the base station greatly varies with the relationship between the communication capacity of the base station and those of mobile terminals.

For instance, where mobile terminals of 75 Mbps in communication capacity are connected to a base station of 150 Mbps in communication capacity, the bandwidth necessary for communication to the mobile terminals is 75 Mbps. Or where base stations constitute a plurality of sectors, the bandwidth necessary for communication routes to the base stations also varies significantly with the arrangement of the mobile terminals to the sectors. For base stations each of whose sectors has a communication capacity of 75 Mbps, where two mobile terminals having a communication capacity of 75 Mbps exist only in one sector, the bandwidth necessary for communication routes to the base stations is at most 75 Mbps but two such mobile terminals exist in different sectors, then the bandwidth necessary for communication routes to the base stations is 150 Mbps at the maximum.

Regarding bandwidth allocation to base stations, for instance Japanese Patent Laid-Open Publication No. 2012-222380 describes bandwidth allocation to mobile terminals according to the service level of each mobile terminal along with bandwidth allocation to base stations according to the load on each base station.

SUMMARY OF THE INVENTION

In a mobile broadband system, as the bandwidth required by base stations significantly varies with the arrangement of mobile terminals, the bandwidth should be restricted relative to the arrangement relationship, namely the connection relationship, between mobile terminals and base stations. However, Japanese Patent Laid-Open Publication No. 2012-222380 discloses no technique to restrict the bandwidth relative to the arrangement of mobile terminals. Moreover, many different types of mobile terminals have come into use with an increase in the sheer number of mobile terminals, and the communication capacity differs significantly with the type of mobile terminal. In addition, various applications are used on mobile terminals, and the bandwidth substantially differs between, for instance, Voice over IP (VoIP) and browsing of websites. The service level described in Japanese Patent Laid-Open Publication No. 2012-222380 cannot appropriately control the bandwidth.

A first object of the present invention is to allocate appropriate bandwidths to base stations correspondingly to changes in the arrangement of mobile terminals. A second object of the invention is to allocate appropriate bandwidths to base stations for which mobile terminals correspondingly to applications or the like to be executed by the mobile terminals.

Mobile gateways according to the invention preferably are such gateways disposed between a plurality of base stations connecting a plurality of mobile terminals and a service network, including a base station information acquiring unit that acquires communication capacities of the base stations; a mobile terminal information acquiring unit that acquires a communication capacity of each type of the mobile terminals; a communication bandwidth estimating unit that estimates the communication bandwidths of the base stations on the basis of the acquired communication capacities of the base stations and the acquired communication capacities of mobile terminals; and a communication bandwidth control unit that controls communication bandwidths corresponding to the base station on the basis of the estimated communication bandwidth.

The mobile gateways according to the invention preferably further include a base station information acquiring unit that acquires the communication capacity of each sector of the base stations; and a communication bandwidth estimating unit that estimates a frequency width for use in each sector of the base stations on the basis of the acquired communication capacity of each sector of the base stations and the acquired communication capacities of the mobile terminals.

Also, the mobile gateways according to the invention preferably include a communication bandwidth estimating unit that executes the estimation in response to a handover between the base stations or between the mobile terminals between the base stations or the sections or executes the estimation in response to a state change between an idle state and an active state of the mobile terminals.

Further, the mobile gateways according to the invention preferably include a policy acquiring unit that acquires a communication bandwidth regarding an application or communication service of the mobile terminal; and a communication bandwidth estimating unit that estimates the acquired communication bandwidths of the base stations on the basis of the acquired communication bandwidth regarding the application or communication service.

The invention can also be identified as a control method for mobile gateways and a radio access network provided with mobile gateways.

According to the invention, appropriate bandwidths can be allocated to base stations correspondingly to changes in the arrangement of mobile terminals. Furthermore, appropriate bandwidths can be allocated to base stations for which mobile terminals are arranged correspondingly to applications to be executed by the mobile terminals.

BRIEF DESCRIPTION OF THE DRAWINGS

FIG. 5 shows an example of base station information table;

FIG. 6 shows an example of mobile terminal type information table;

FIG. 7 shows an example of mobile terminal management table;

FIG. 8 shows an example of sectoral frequency band management table;

FIG. 9 shows an example of communication bandwidth management table classified by base station;

FIG. 11 is a flow chart of calculating the communication bandwidth of each base station;

FIG. 12 shows an example of configuration of a mobile gateway;

FIG. 15 shows an example of configuration of a mobile communication system provided with a plurality of mobile gateways.

DETAILED DESCRIPTION OF THE INVENTION

In the following paragraphs a mobile gateway which is an exemplary embodiment of the invention, its program and a radio access network equipped with the gateway will be described with reference to the accompanying drawings.

Figure 1:
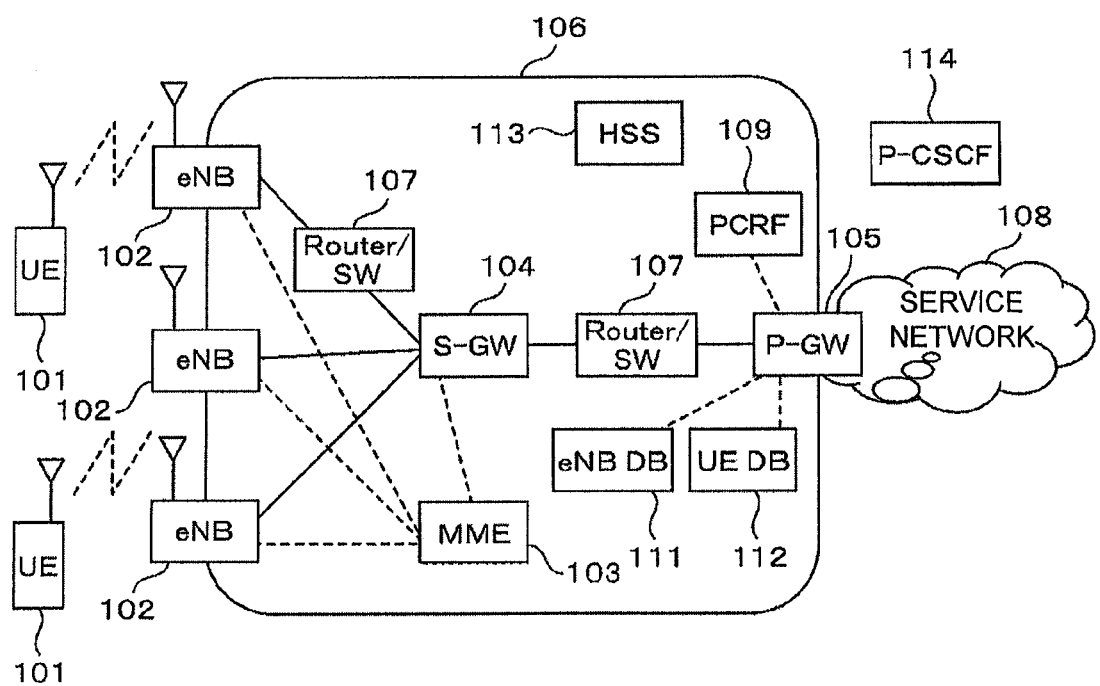
FIG. 1 shows an example of configuration of a mobile communication system.

FIG. 1 shows an example of configuration of a mobile communication system. Whereas its application to LTE commonly referred to as 3.9G will be mainly described by way of example, it can similarly applied to WiMAX or 3G systems as well. UEs 101 are mobile terminals; eNBs (enhanced Nodes B) 102, base stations; MME (Mobility Management Entity) 103, a movement managing server for the mobility management, authentication and authorization of terminals; HSS (Home Subscriber Server) 113, a server constituting a database for mobile terminals; S-GW (Serving GW) 104, a first mobile gateway constituting an anchor point in a radio access network 106; P-GW (Packet Data Network GW) 105, a second mobile gateway constituting a boundary between a service network 108 and the radio access network 106; the radio access network 106 relays radio access from any UE 101 to the service network 108; a router/switch 107 includes routers and switches installed in the radio access network 106 between any eNB 102 and the S-GW 104 or between the P-GW 105 and the MME 103; the service network 108 is an external network (Internet) that provides service to the UEs 101; and PCRF (Policy and Charging Rules Function) 109 is a policy server that performs control of QoS and accounting. eNB DB 111 is a base station database storing information of the eNBs 102 installed in the radio access network 106 and also storing IDs to which eNBs 102 are assigned, communication capacities held by eNBs 102 and information including the number of sectors that eNBs 102 have. UE DB 112 is a mobile terminal type database storing the communication capacities of UEs 101. P-CSCF (Proxy Call Session Controller Function) 114 is a call control server, which processes SIP (Session Initiation Protocol) in a communication service known as IMS (IP Multimedia Subsystem).

Although LTE is taken up in FIG. 1 as an example, Access Service Network GateWay (ASN-GW) has a function corresponding to S-GW/MME and so is Home Agent (HA) corresponding to P-GW in WiMAX. Likewise, Serving GPRS Support Node (SGSN) has a function corresponding to S-GW/MME and so is Gateway GPRS Support Node (GGSN) corresponding to P-GW in the 3G system.

Figure 2:
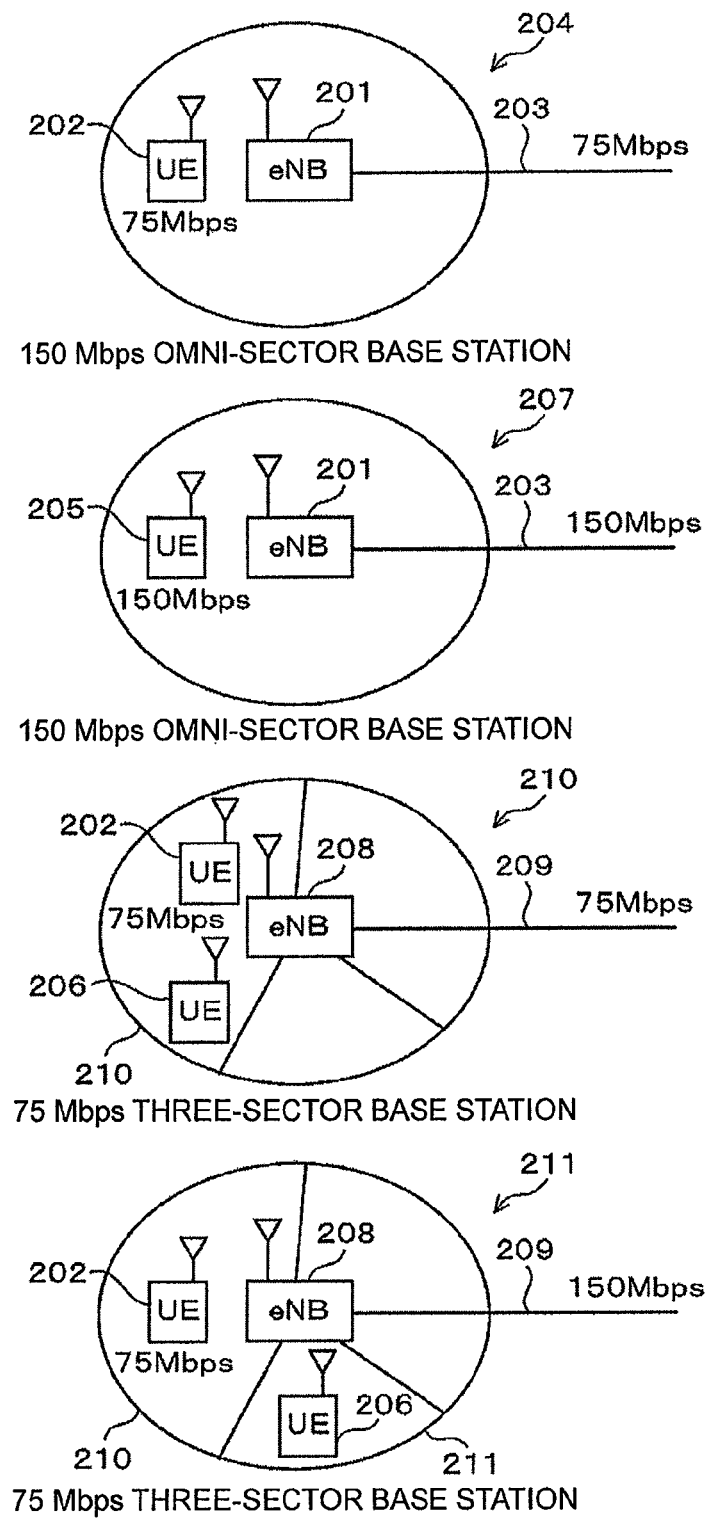
FIG. 2 shows examples of bandwidth allocated in configurations of arrangement of base stations differing in communication capacity and mobile terminals differing in communication capacity.

FIG. 2 shows examples of bandwidth allocated in a configurations of arrangement 204, 207, 210 and 211 in which eNBs 102 differing in communication capacity (omni-sector base station 201 and three-sector base station 208) and UEs 101 (UE 202, 205 and 106) are arranged under each eNB 102. The omni-sector base station 201 is a single-sector base station with a 150 Mbps communication capacity among different eNBs 102, an eNB 102 that can use a frequency width of 20 MHz in FDD-LTE for instance. The omni-sector base station 201 may, if a sufficient frequency width cannot be secured in a single frequency band, utilize the function of carrier aggregation (CA) by which a plurality of different frequency bands (component carrier) are used in a bundle. For instance, the omni-sector base station 201 has a 75 Mbps communication capacity by using a 10 MHz frequency width at 2.1 GHz and a 75 Mbps communication capacity by using a 10 MHz frequency width at 3.4 GHz; by using the two frequency bands 2.1 GHz and 3.4 GHz, it has a communication capacity of 150 Mbps. An access line 203 is a communication route from the eNB 102, which is the omni-sector base station 201, to the P-GW 105 in FIG. 1. The arrangement configuration 204 is a case in which a UE 202 incompatible with CA and having a communication capacity of only 75 Mbps at 2.1 GHz is arranged under the omni-sector base station 201, and the bandwidth allocated by the omni-sector base station 201 to the access line 203 is 75 Mbps.

In the arrangement configuration 207, having the omni-sector base station 201 like the arrangement configuration 204, the UE 205 different from the UE 201 in type is compatible with CA and has a communication capacity of 150 Mbps by using the 2.1 GHz and 3.4 GHz bands at the same time, and the bandwidth allocated by the omni-sector base station 201 to the access line 203 is 150 Mbps.

The arrangement configuration 210 is a case in which the three-sector base station 208 of which each of the three sectors has a 75 Mbps communication capacity and UEs 202 and 206 in which one sector 210 of the three sectors has a 75 Mbps communication capacity are concentrated in the eNB 102; the bandwidth allocated by the three-sector base station 208 to an access line 209 is 75 Mbps. The access line 209, like the access line 203, is a communication route from the eNB 102, which is the three-sector base station 208, to the P-GW 105 in FIG. 1.

In the arrangement configuration 211, though it has the three-sector base station 208 and the UEs 202 and 206 like the arrangement configuration 210, the UEs 202 and 206, each having a 75 Mbps communication capacity, are arranged in two different sectors 210 and 211, and the bandwidth allocated to the access line 209 of the three-sector base station 208 is 150 Mbps.

In this way, where the eNB 102 is the omni-sector base station 201, a bandwidth is allocated to the access line 203 of the eNB 102 according to the communication capacity of the eNB 102 and the type of the UE 101 arranged in sector among other factors. Or where the eNB 102 is the three-sector base station 208 or the like having a plurality of sectors, a bandwidth is allocated to the access line 209 of the eNB 102 according to the choice of the sector in the eNB 102 for arrangement of the UE 101 or the type of each arranged UE 101 among other factors. And optimal bandwidth allocation can be accomplished by allocating a bandwidth according to variations in UE 101 arrangement.

Figure 3:
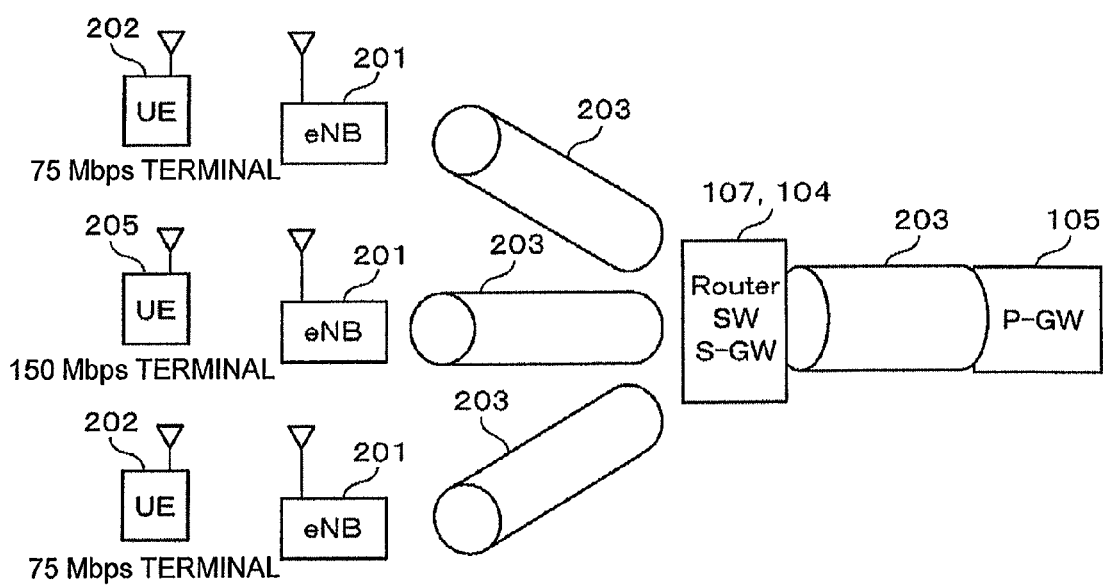
FIG. 3 shows an example of configuration of allocating bandwidths to a plurality of base stations.

FIG. 3 shows an example of configuration of allocating bandwidths to a plurality of omni-sector base stations 201. While bandwidths are allocated according to the relationship between one eNB 201 and the UE 101 in the configuration of FIG. 2, in order to connect a plurality of eNBs 102 (including not only a plurality of omni-sector base stations 201 but also a plurality of three-sector base stations 208) to the service network 108 via one the P-GW 105 as shown in FIG. 1 the P-GW 105 allocates a bandwidth to each of the omni-sector base stations 201 in the configuration of FIG. 3. To each of the three omni-sector base stations 201, the UE 202 with a 75 Mbps communication capacity or the UE 205 with a 150 Mbps communication capacity is arranged and connected, and each communicates with the P-GW 105 via the access line 203. While physical access lines here are integrated into one by the router/switch 107 or the S-GW 104 here, logical access lines are independent, and a bandwidth can be allocated to each eNB 102 or each UE 101 by the action of the P-GW 105 as will be described afterwards with reference to FIG. 12.

Figure 4:
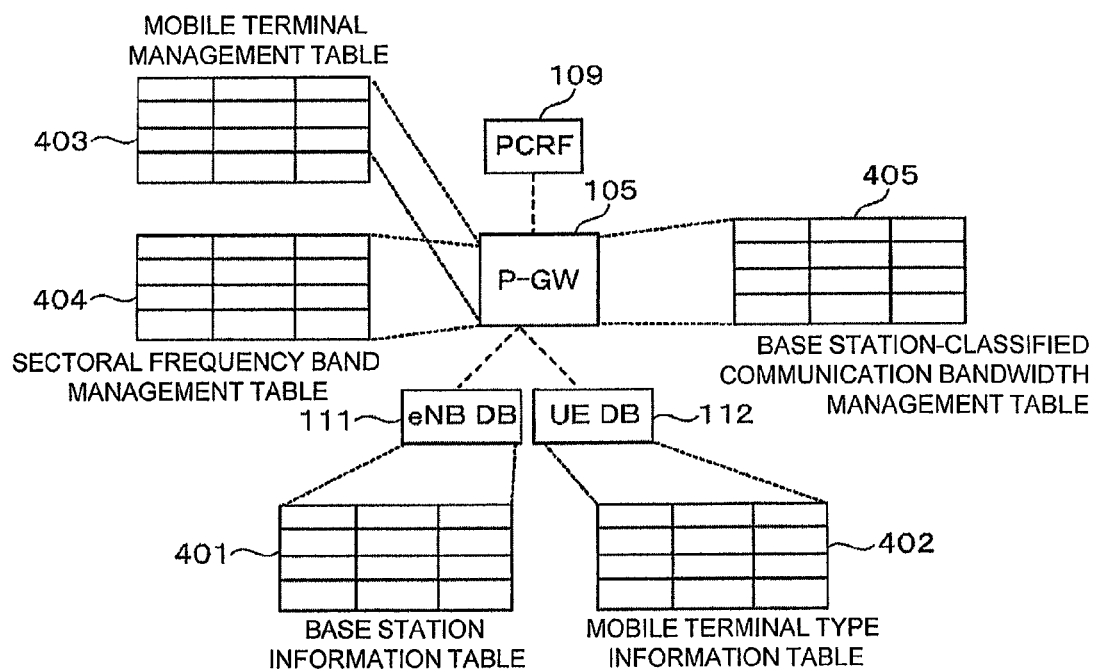
FIG. 4 shows relationships among sets of information that a mobile gateway, a policy server, a base station database and a terminal type database respectively have.

FIG. 4 shows relationships among sets of information that each of the P-GW 105, PCRF 109, eNB DB 111 and UE DB 112 has. By causing the P-GW 105 to know the communication capacity of the eNB 102 and to manage the communication capacity of the UE 101 engaged in connected state and the eNB 102 placed in connected state, namely accommodated, by the arrangement and connection of the pertinent UE 101 thereby to estimate the bandwidth required by each eNB 102, traffic is managed for each eNB 102.

A base station information table 401 in the eNB DB 111 in which information in the eNB 102 installed in the radio access network 106 is stored is used by the P-GW 105 for acquiring information on the communication capacity of the eNB 102.

A mobile terminal type information table 402 in the UE DB 112 in which the communication capacity of the UE 101 is a table of information on each type of the UE 101. The eNB DB 111 and the UE DB 112 are installed independently of each other as databases. As will be described afterwards with reference to FIG. 15, they may as well be arranged to be accessible from a plurality of P-GWs 105 as be built into the P-GW 105. A mobile terminal management table 403 is a table holding the communication capacity of the UE 101 and the eNB ID accommodated among others in the P-GW 105, and a sectoral frequency band management table 404 is a sectoral table managed for the P-GW 105 to grasp the bandwidth required by the eNB 102 for communication for each sector. A base station-classified communication bandwidth management table 405 is a table of bandwidth required for communication with the eNBs 102 and queue information for use in bandwidth control by integrating communication bandwidths regarding sectors belonging to the same eNB 102 on the basis of the sectoral frequency band management table 404.

FIG. 5 shows an example of the base station information table 401 managed by the eNB DB 111 storing information on the eNBs 102, in which a base station ID 501 corresponds to, for instance, Global eNB ID in LTE or Enhanced Cell Global IDs (ECGI) of identifiers including sector IDs. A number of sectors 502 refers to the number of sectors in the eNB 102, and a CA flag 503, to a flag indicating whether or not the CA by which the eNB 102 bundles together different bands for communication is available. A frequency band 1 504 concerns information on a first frequency band (channel number) supported by the eNB 102; a frequency width 1 505, the frequency width (in MHz) available for use in the first frequency band of the frequency band 1 504; a frequency band 2 506, information on the second frequency band (channel number) supported by the eNB 102; and a frequency width 2 507, the frequency width (in MHz) available for use in the second frequency band of the frequency band 2 506. More frequency bands and frequency widths may be provided. To add, when no sector ID is included in the base station ID 501, the frequency width 1 505 and the frequency width 2 507 may be such values as can be equally divided by the number of sectors 502 or as can be allocated to as many sectors as the number of sectors 502.

FIG. 6 shows an example of mobile terminal type information table 402 for each type of the UE 101 managed by the UE DB 112 storing the communication capacities of the UEs 101; a TAC 601 is an ID indicating the type of the UE 101, for which the Type Approval Code (TAC) of the International Mobile Equipment Identifier (IMEI) or the like is used. A CA flag 602 is a flag indicating whether or not CA by which the UE 101 bundles together different bands for communication is available. A frequency band 1 603 concerns information of the first frequency band (channel number) supported by the UE 101; a frequency width 1 604, the frequency width (in MHz) available for use in the first frequency band of the frequency band 1 603; a frequency band 2 605, information of the second frequency band (channel number) supported by the UE 101; and a frequency width 2 606, a radio frequency width (in MHz) available in the frequency band 2 605.

FIG. 7 shows an example of mobile terminal management table 403 for managing the UE 101 accommodated in the P-GW 105. An IMSI 701 is the user ID of the UE 101, an ID stored in a Subscriber Identity Module (SIM) card; and an IMEI 702, an identification number of the UE 101 used by the user. A state 703 is the state of the UE, whether the UE is in an idle state in which radio resources are open or in a connected state in which they are connected, and a base stations ID 704 is the ID of the eNB 102 accommodating the UE 101 in a connected state, for instance accommodating a part of the eNB 102 of the ECGI like the base station ID 501 in FIG. 5. A sector ID 705 is the ID of a sector of the eNB 102 accommodating the UE 101 in a connected state, for instance accommodating a part indicating a sector of the ECGI. A TAC 706 is an ID indicating the type of the UE 101; for instance, the TAC is stored in the IMEI like the TAC 601 in FIG. 6. A maximum communication bandwidth 707 is the maximum communication bandwidth permitted to a user using the UE 101. It indicates the communication bandwidth when the user is restricted in availability of mobile communication service by the contract, in terms of service grade or the like; it is determined on the basis of a value notified by the PCRF 109 or the like when the user has connected his equipment to the mobile communication service. To add, a communication bandwidth matching an application to be executed on the UE 101 may be set as well.

FIG. 8 shows an example of sectoral frequency band management table 404 managed within the P-GW 105. A base station ID 801 is the ID of the eNB 102, and a sector ID 802 is the ID of each sector of the eNB 102. A frequency band 1 803 and a frequency band 2 805 are frequency bands with which each sector of the eNB 102 can communicate; an in-use frequency width 1 804 and an in-use frequency width 2 806 are frequency widths at which each sector is presumably using in the frequency band 1 803 and the frequency band 2 805, respectively.

FIG. 9 shows an example of base station-classified communication bandwidth management table 405 including bandwidth required for communication with the eNB 102 managed within the P-GW 105 and queue information for use in bandwidth control. A base station ID 901 is the ID of the eNB, and a communication bandwidth 902 is the bandwidth used for communication with the eNB 102. A base station address 903 is the address used for communication with the eNB 102; for instance, the IP address of the eNB 102 and the VLAN value or the label value of MPLS used for communication with the eNB 102 correspond to this address. Queue information 904 is information on the queue used for allocating bandwidths for communication with the eNB 102. Any information on the queue, only if usable for allocation of communication bandwidths, would suffice, or some other configuration for allocation of communication bandwidths than a queue may as well be used, and in this case information for its communication bandwidth allocation can be used instead.

Figure 10:
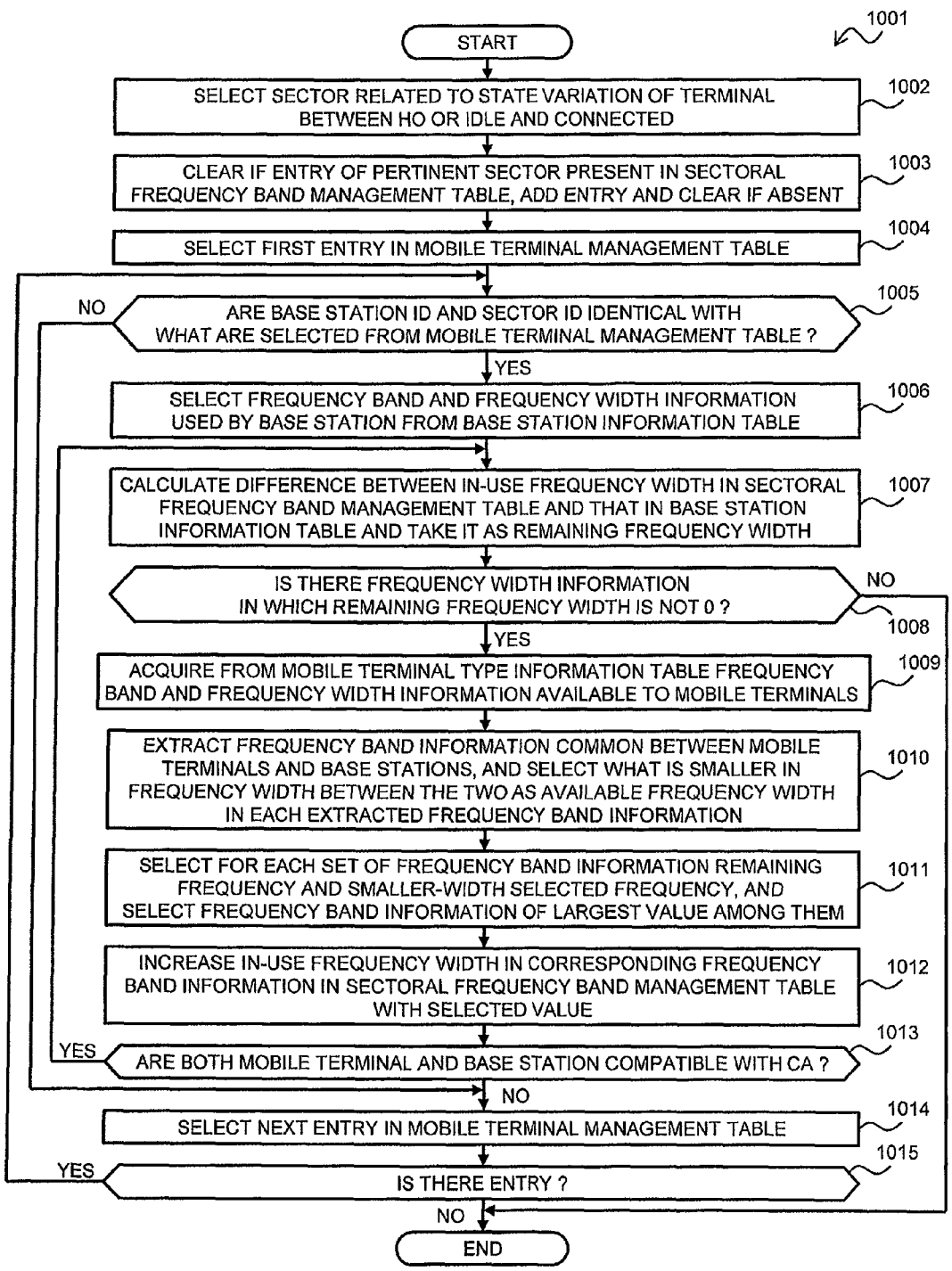
FIG. 10 is a flow chart of calculating the frequency width of each sector presumably in use.

FIG. 10 is a flow chart 1001 showing the procedure of calculating the in-use frequency widths 804 and 806 presumably being used sector by sector as shown in FIG. 8. The P-GW 105, taking the opportunity of the transition of the UE 101 from a hand-off (HO) or idle state to a connected state or the like, updates the base station ID 704, which is the ID of the eNB 102, and a sector ID 705, which is a sector ID, regarding the mobile terminal management table 403 for managing the UE 101 of FIG. 7, performs processing of FIG. 10 shown below, and updates the in-use frequency width 1 804, which is presumably in use sector by sector. First, a sector having accomplished transition of the UE 101 from a hand-off or idle state to a connected state or the like is selected (1002), and adds an entry in the absence of information on the pertinent sector in the sectoral frequency band management table 404 or clears the content of the entry in its presence (1003).

Next, the first UE 101 entry is selected from the mobile terminal management table 403 for managing the UE 101 accommodated in the P-GW 105 (1004); it is checked whether the base station ID 801 and the sector ID 802 in the additional or cleared entry to or from the sectoral frequency band management table 404 are identical with the base station ID 704 and the sector ID 705 selected from the mobile terminal management table 403 (1005); if not identical the next UE 101 entry is selected (1014); or if there is no entry, the processing is ended (1015). If they are identical, the base station information table 401 is accessed to obtain information on a frequency band and frequency width permitting communication from the pertinent eNB 102 (1006). Then, the sectoral frequency band management table 404 managed within the P-GW 105 is accessed and, by calculating the difference between the values of the frequency widths 804 and 806 presumably in use regarding each information item on the frequency band in the pertinent sector and the frequency width of the eNB 102 accessed at step 1006, the remaining frequency widths for each information item on the frequency bands are figured out (1007). If every one of these remaining frequency widths is 0, it is assumed that there is no frequency width that can be added to the pertinent eNB 102, and the processing is ended (1008).

If there is information on any frequency band that can be added, the mobile terminal type information table 402 for every type of the UE 101 is accessed, and information on the frequency band with which the pertinent UE 101 can communicate and its frequency width are acquired (1009). Further, the information on the frequency band with which the pertinent eNB 102 can communicate and its frequency width, acquired at step 1006, and the information on the frequency band and its frequency width, acquired at step 1009, are compared, the smaller of the information on common frequency bands and their frequency widths is selected as the frequency width with which communication is possible (1010). If the UE 101 comes to be connected then and if the maximum communication bandwidth and the like are notified from PCRF 109 and setting is made to the maximum communication bandwidth 707, a smaller communicable frequency width is chosen to match the maximum communication bandwidth 707. Next, the remaining frequency calculated at step 1007 for each item of information on the frequency band and the communicable frequency width between the UE 101 and the eNB 102 are compared to select the smaller value (1010), and information on the frequency band of the maximum frequency width is selected as the frequency width that can be added (1011). Next, this frequency width that can be added is added to a frequency width (either 804 or 806) presumably in use for information on the frequency band in the pertinent sector (1012).

Further, it is checked whether or not the UE 101 and the eNB 102 are compatible with CA; if the CA flag 602 in the mobile terminal type information table 402 of the UE 101 and the CA flag 503 in the base station information table 401 of the eNB 102 indicate CA compatibility, these actions are repeated to obtain any usable frequency width from information on other frequency bands (1013). In the case of CA incompatibility, the next UE 101 entry is selected from the mobile terminal management table 403 (1014), the processing is continued back from step 1005. If there is no entry, the processing is ended (1015).

To add, there is a possibility that all the remaining frequency widths becomes 0 at step 1008, leaving no frequency width that can be added, but the possibility of all the remaining frequency widths to become 0 can be reduced by narrowing in advance the communication bandwidths of each UE 101 on the basis of the maximum communication bandwidth 707 set in response to a notification from the PCRF 109. Also, by selecting at step 1011 information on the frequency band of the minimum frequency width, instead of the maximum frequency width, as the frequency width that can be added, the communication bandwidth can be narrowed to reduce the possibility of all the remaining frequency widths to become 0.

FIG. 11 is a flow chart 1101 of figuring out communication bandwidth for each eNB 102 from the frequency width presumably being use in each sector obtained as charted in FIG. 10. The P-GW 105 performs the following actions on the opportunity of transition of the UE 101 from a hand-off or idle state to a connected state or the like to update the communication bandwidth to be allocated to the eNB 102 after the processing charted in FIG. 10. First, eNB 102 entries related to transition of the UE 101 from a hand-off or idle state to a connected state are selected from the base station-classified communication bandwidth management table 405 used for managing the communication bandwidth required for communication with each eNB 102, and the communication bandwidth 902 is cleared of entries. If there is no entry, entries of the pertinent eNB 102 are added (1102).

Next, the sectoral frequency band management table 404 is searched to check whether or not the base station ID 901 of the base station-classified communication bandwidth management table 405 is identical with the base station ID 801 of the sectoral frequency band management table 404 (1103) (1104). If it is identical, frequency widths in the sectoral frequency band management table 404 which are presumably in use are totaled and converted into communication bandwidths in units of frequency width. In LTE for instance, they can be converted into 37.5 Mbps at 5 MHz. The converted communication bandwidths are added to the communication bandwidth 902 in the base station-classified communication bandwidth management table 405 (1106). On this occasion, queue information 904 for allocating communication bandwidths matching the communication bandwidth 902 may be set. Then the next entry in the sectoral frequency band management table 404 is selected, and the foregoing processing is repeated (1107). In the absence of any entry, the processing is ended (1108). This processing enables the P-GW 105 to grasp the bandwidth required for communication for each eNB 102 and to perform control accordingly, and makes it possible to achieve appropriate bandwidth allocation to the access line to the eNB 102 and the relay line.

FIG. 12 shows an example of configuration of the P-GW 105. A non-volatile memory 1203 is a flash memory or the like, in which programs executed by a CPU 1201 and configuration information are stored. A memory 1202, in which programs loaded from the non-volatile memory 1203 are stored, is accessed at the time of execution by the CPU 1201 or stores various tables 403 to 405. Interfaces 1204 and 1205 are used when packets are received from other nodes including the eNB 102 or the service network 108 are stored into the memory 1202 or packets processed by the CPU 1201 are transmitted to other nodes. A switching unit 1206 is a communication path within the P-GW 105 for use in storing packets received from the interface 1204 into the memory 1202 or transmitting packets processed by the CPU 1201 from the memory 1202 via the interface 1204.

The interface 1204 has a plurality of queues in multiple stages. A queue 1207, for instance, is provided for each eNB 102 to serve as the queue for allocating communication bandwidths on the basis of the value of the queue information 904 for each eNB 102 calculated as shown in flow chart of FIG. 11. A queue 1208 provided for each UE 101 accommodated in each eNB 102, is the queue for allocating a communication bandwidth for each UE 101 determined on the basis of the type of the UE 101, an application to be described afterwards, and other factors. Switches 1209 and 1210 are intended for changing over the connecting relation between the queues 1207 and 1208 on the basis of the accommodating relation between the eNB 102 and the UE 101 and other factors. Further, a queue is provided for each sector for sector-by-sector allocation of communication bandwidths. Thus it is possible to provide a queue, separately from the queues 1207 and 1208 or instead of the queue 1208, for preparing the sectoral frequency band management table 404 of FIG. 8 on the basis of the flow chart 1001 of FIG. 10 and allocating communication bandwidths on the basis of the values of the in-use frequency width 1 804 and the in-use frequency width 2 806 for each sector.

To add, while the foregoing description referred to a configuration of providing the queues 1207 and 1208 in the interface 1204, the queues 1207 and 1208 may as well be realized on the memory 1202 under the control of the CPU 1201, or part of the queues 1207 and 1208 may be disposed in the interface 1204 with the rest of the queues 1207 and 1208 realized on the memory 1202.

In the non-volatile memory 1203, there are stored a base station information acquiring program 1211 for acquiring the base station information table 401 from the eNB DB 111 shown in FIG. 4, a mobile terminal information acquiring program 1212 for acquiring the mobile terminal type information table 402 from the UE DB 112, a policy acquiring program 1213 for acquiring information on policies from the PCRF 109, and a communication bandwidth estimating program 1214 for estimating communication bandwidths by calculating the frequency widths presumably in use shown in FIGS. 10 and 11. These programs are loaded into the memory 1202 and executed by the CPU 1201 to cause the CPU 1201 to function as a base station information acquiring unit, a mobile terminal information acquiring unit, a policy acquiring unit and a communication bandwidth estimating unit. To add, by providing a simple CPU for each program instead of the CPU 1201 to perform multiple functions, each program may as well be realized as hardware.

Next, the communication procedure and the allocation of communication bandwidths when the UE 101 has come to be connected to the eNB 102 will be described with reference to FIG. 13. When requested for connection to the service network 108, the UE 101 sets a radio link (1301), and sends a connection request message to the MME 103 via the eNB 102 (1302 and 1303). The connection request message (1303) includes ECGI as the ID of the sector to which the UE 101 addressed the connection request. Upon receiving the connection request message, the MME 103 acquires from the HSS 113 authentication data for the UE 101 and data regarding an encrypted key for use by the UE 101, and processes authentication of the UE 101 (1304). When the authentication is successfully processed, the MME 103 registers the position of the UE 101 with the HSS 113 (1305), acquires profile information on the subscriber (1306), and acquires the service network 108 to be connected to and information on the P-GW 105 of the destination service network (1306). Further, the MME 103 requests the S-GW 104 for connection to the P-GW 105, which is to serve as a connection point to the service network 108 (1307), and the S-GW 104 transmits a request for session establishment to the P-GW 105 on the basis of information on connection to the service network 108 (1308). These connection request messages (1307 and 1308) include the ID (ECGI) of the sector having accommodated the connection requesting UE 101, the ID of the UE 101 (IMEI) and the user ID (IMSI).

Upon receiving the connection request (1308), the P-GW 105, if it has no information on the pertinent eNB 102, inquires with the eNB DB 111 in which eNB information is stored by sending eNB information acquisition request (eNB query) to acquire eNB information from the base station information table 401 (1309), and acquires the information from the response eNB Rsp (1310). Further, if it does not hold the communication capacity of the pertinent UE 101, the P-GW 105 inquires with the UE DB 112 in which the communication capacity of each type of the UE 101 is stored by sending a terminal communication capacity acquisition request (UE query) to acquire the communication capacity of the pertinent UE 101 from the mobile terminal type information table 402 of the UE 101 (1311), and acquires the information from the response (UE Rsp) (1312). Further, the P-GW 105 estimates the frequency width of each frequency band engaged in connected state for each sector on the basis of the flow chart of FIG. 10, and further updates the communication bandwidth of each eNB on the basis of the flow chart of FIG. 11 (1313). The updated communication bandwidth is set as the bandwidth of the queue 1207 in FIG. 12, followed by bandwidth controls of packets destined for the eNB 102.

After that, the P-GW 105 having accepted the request for session establishment transmits a response for session establishment to the S-GW 104 (1314). The S-GW 104 returns the response for session establishment to the MME 103 (1315). To notify the eNB 102 and the UE 101 of the readiness to establish the session, the MME 103 transmits an Initial Context Setup/Attach Accept message to the eNB 102 (1316). The eNB 102 now establishes a radio link connection to the UE 101 (1317 and 1318), and returns an Initial Context Setup Response message to the MME (1319). Further the UE 101 gives a response on the connection establishment by an Attach Complete message (1320).

Figure 14:
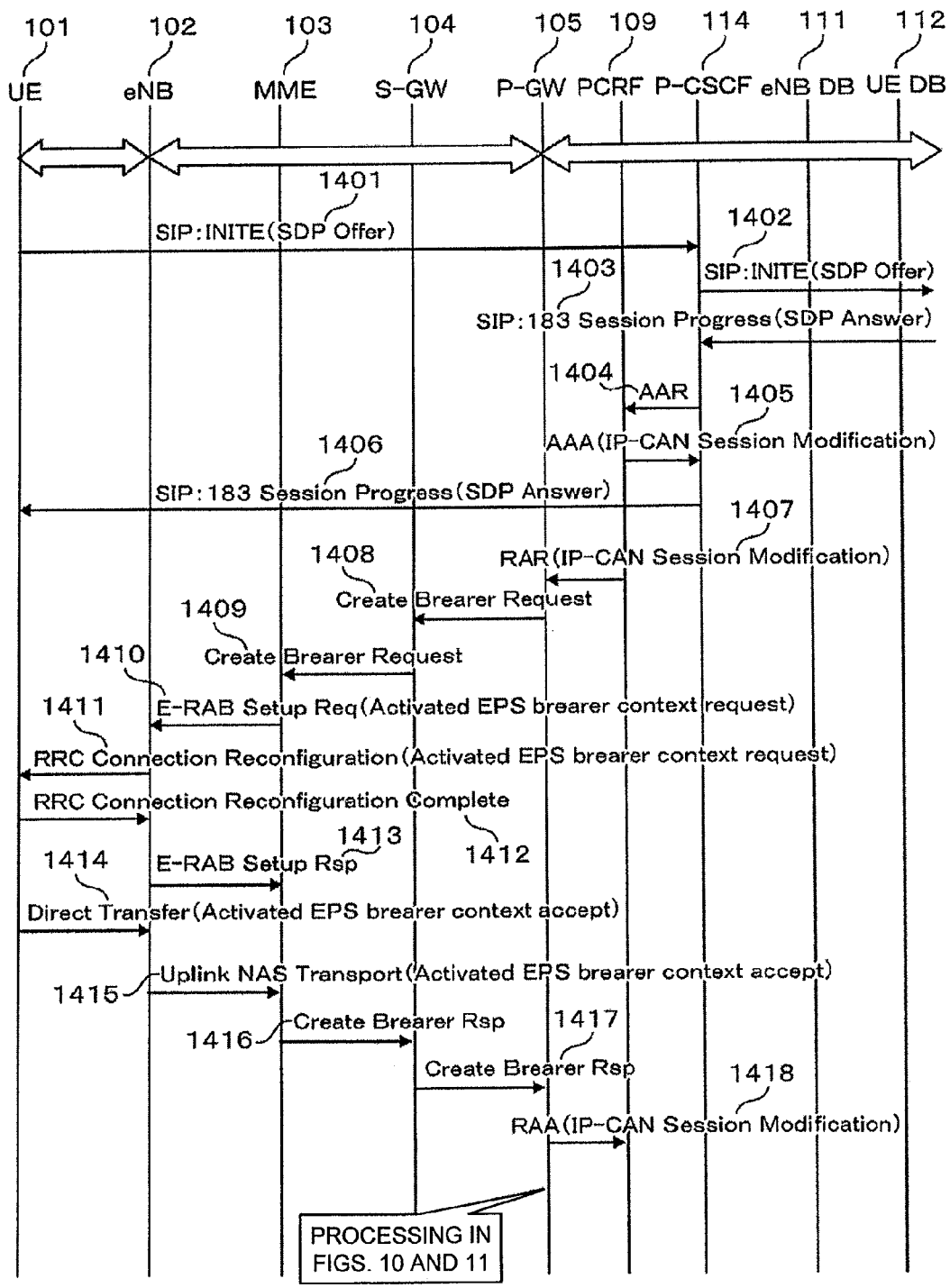
FIG. 14 shows an example of communication procedure where a communication bandwidth is to be allocated to each mobile terminal by an application or a communication service.

Next, actions to allocate by an application used by the UE 101 or by a communication service a communication bandwidth required by each eNB 102 will be described with reference to FIG. 14. FIG. 14 shows an example of actions by LTE supporting a communication system known as IP Multimedia Subsystem (IMS). The UE 101, when to start use of an application such as TV telephone or a communication service, initiates a call to the other party to the communication with the UE 101 and a call control server 114 known as P-CSCF by Session Initiation Protocol (SIP) (1401). This message contains CODEC information known as Session Description Protocol (SDP) and used by the session and information on bandwidths. The P-CSCF 114 sends this message to the next server (S-CSCF or the like not shown) and waits for a response to the message (1402). Upon receiving the response (1403), the P-CSCF 114 notifies the PCRF 109 of Policy Charging Control (PCC) rules by an Authentication Authorization Request (AAR) message (1404) and responses by an Authentication Authorization Answer (AAA) (1405). The P-CSCF 114 sends to the UE 101 a response message to the other party to the communication by a Session Initiation Protocol (SIP) (1046).

The PCRF 109 sends to the UE 101 and the P-GW 105 a Re-Auth-Request (RAR) message as a request for creating a new bearer on the basis of the PCC rules notified by the P-CSCF 114 (1407). This message contains information on the communication bandwidth of the application or service required by the new bearer. The P-GW 105 sends to the S-GW 104 a Create Bearer Request, which is a request message for creating the bearer (1408), the S-GW 104 sends to the MME 103 a Create Bearer Request (1409). The MME 103 sends to the eNB 102 an E-RAB Setup Req (Activated EPS bearer context request) message for notifying the eNB 102 and the UE 101 of the creation of the bearer (1410); the eNB 102 sends an RRC Connection Reconfiguration (Activated EPS bearer context request) message to the UE 101 (1411); the UE 101 sends response messages (1412 to 1415) via the eNB 102; the MME 103 sends a Create Bearer Response to the S-GW 104 as a response to the message (1409) (1416); and the S-GW 104 sends a Create Response to the P-GW 105 as a response to the transmission of the message (1408) (1417). The P-GW 105 further sends an RAA (Re-Auth Answer) message to the PCRF 109 as a response to the transmission of the message (1407) (1418).

The P-GW 105 further calculates a communication bandwidth as the UE 101 by adding the communication bandwidth to be used by the added bearer to the value in the column of the maximum communication bandwidth 707 in the mobile terminal management table 403 for the pertinent UE 101. Here, setting may as well be so made as to allocate the calculated communication bandwidth to the queue 1208. After that, the P-GW 105 perform the processing in the flow charts of FIG. 10 and FIG. 11, and updates the bandwidth required for communication with the eNB 102 and the base station-classified communication bandwidth management table 405 of the queue to be used for bandwidth control. To add, information regarding the application or communication service may as well be acquired from the contents of passing packets by Deep Packet Inspection (DPI). The processing so far described enables an appropriate communication bandwidth to be allocated to the eNB 102 according to the application or communication service to be used by the UE 101.

FIG. 1 shows one each of S-GW 104 and P-GW 105 is used, but FIG. 15 shows a case in which a plurality each of S-GW 104 and P-GW 105 are provided and operate in coordination. In the network configuration of FIG. 15, a router (LSR: Label Switching Router) 1501 supports a Multi Protocol Labeling Switch (MPLS) capable of bandwidth guarantee; a radio access network 1502 is a radio access network supporting the MPLS; and a Software Defined Network (SDN) Controller 1503 is a controller that receives bandwidth allocation requests from the S-GW 104 and the P-GW 105 and sets a path from the S-GW 104, the P-GW 105 and the eNB 102 by controlling the LSR 1501.

The P-GW 105, when it has altered the communication bandwidth for each eNB 102 by executing the processing of the flow charts of FIG. 10 and FIG. 11, notifies the SDN controller 1503 of the altered communication bandwidth for each eNB 102. The SDN Controller, when notified of communication bandwidths for the same eNB 102 by a plurality of P-GWs 105, mediates the bandwidths, and notifies the P-GWs 105 of the altered values and the label value of the MPLS. Further, the SDN controller 1503 is enabled to secure a communication bandwidth for each eNB 102 among the plurality of P-GWs 105 by setting a path for the LSR 1501 in the radio access network 1502, and thereby to distribute loads among the plurality of P-GWs 105.

Figure 13:
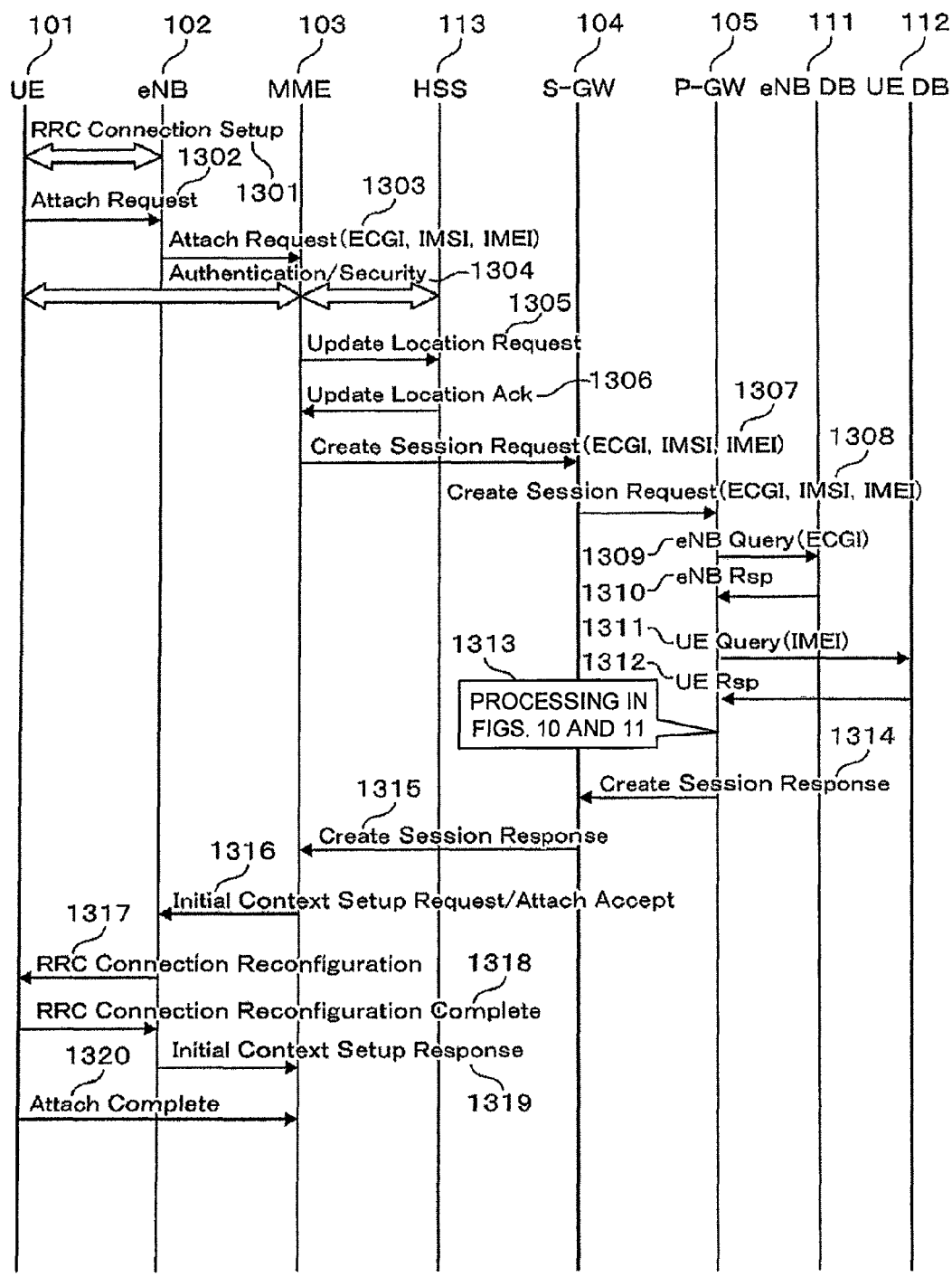
FIG. 13 shows an example of communication procedure where a mobile terminal has come to be connected to a base station.
Figure 16:
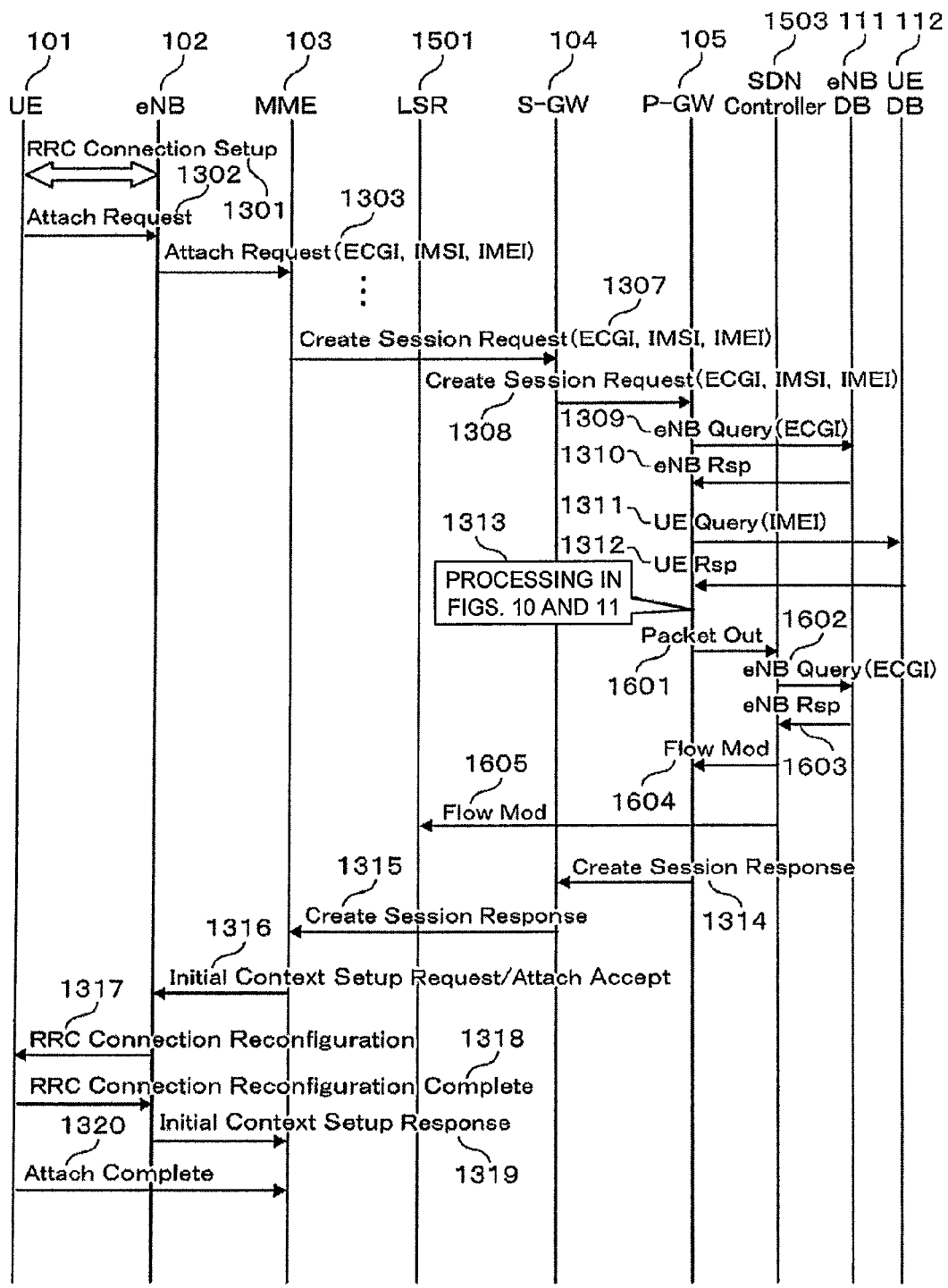
FIG. 16 shows an example of communication procedure to mediate bandwidths and set paths in a mobile communication system provided with a plurality of mobile gateways.

FIG. 16 shows the communication procedure in the case of taking the opportunity of transition of the UE 101 from the hand-off or idle state the connected state to modify the MPLS path; the procedural steps from 1301 to 1313 are the same as their counterparts in FIG. 13. The P-GW 105, when it has calculated the communication bandwidth to be allocated to each eNB 102, transmits the allocated communication bandwidths to the SDN controller 1503 (1601). The SDN controller 1503, when it has received the communication bandwidths to be allocated and if it holds no communication capacity information on the eNBs 102, accesses the eNB DB 111 storing information on the eNBs 102 and acquires eNB information (1602 and 1603). Or it may as well access the eNB 102 managing system to acquire information on each eNB 102. The SDN controller 1503, if managing communication bandwidths to be allocated to eNBs 102 from a plurality of P-GWs 105, mediates the allocation and, if bandwidth alteration is needed for any other eNB 102, notifies the P-GW 105 of the need and also notifies the LSR 1501 of the bandwidth alteration of the path. The SDN controller 1503 responds to the P-GW 105 from which the notification of requested bandwidth has been received with a reply including the path label information and information on the communication bandwidth (1604), and also notifies the related LSR 1501 of the path information (1605). Either the P-GW 105 or the LSR 1501 may transmit a Label Switching Protocol (LSP) as required and secure a path. In the rest of the process, the P-GW 105 follows the same communication procedure as 1314 to 1320 in FIG. 13.

What is claimed is:

1. A network system disposed between a plurality of base stations connecting a plurality of mobile terminals and a service network, comprising:
    one or more processors; and
    one or more storage media connected to the one or more processors and which store instructions that, when executed on the one or more processors, cause the one or more processors to:
    acquire state information of each of the base stations;
    acquire communication states of the mobile terminals accommodated by the base stations specified in the acquired state information; and control communication bandwidths allocated to a communication path for each of the mobile terminals accommodated by each of the base stations on the basis of the acquired state information and the communication states of the mobile terminals connected to the base stations,
    acquire communication capacities of the base stations as the status information;
    acquire communication capacities of the mobile terminals;
    estimate a bandwidth of communication to the base stations on the basis of the acquired communication capacities of the base stations and the acquired communication capacities of the mobile terminals;
    control the communication bandwidths allocated to a communication path for each of the mobile terminals accommodated by each of the base stations on the basis of the estimated communication bandwidth;
    acquire a communication capacity for each frequency band of each of the base stations;
    acquire a communication capacity for each frequency band of each of the mobile terminals;
    estimate a frequency width to be used for each frequency band of the base stations on the basis of the acquired communication capacity for each frequency band of the base stations and the acquired communication capacity for each frequency band of the mobile terminals;
    estimate the frequency width used by each frequency band of the base stations by calculating a total value of the communication capacities of the frequency bands of the mobile terminals connectable to the base stations and corresponding to the base stations according to the communication capacities of each frequency band of the base stations;
    convert each of the estimated frequency widths of the frequency bands of the base stations; and
    estimate the communication bandwidths corresponding to the base stations by calculating the total value of the converted communication bandwidths of the frequency bands of the base stations.

2. The network system according to claim 1,
    wherein the acquired state information includes a communication capacity of each sector of each of the base stations,
    wherein the communication bandwidths are controlled to be allocated on the basis of the acquired communication capacity of each sector of each of the base stations and the communication state of the mobile terminals accommodated by each sector of each of the base stations.

3. The network system according to claim 1, wherein the one or more storage media further store instructions that, when executed on the one or more processors, cause the one or more processors to:
    acquire a state change between an idle state and a connected state of each of the mobile terminals as the communication states thereof.

4. The network system according to claim 1, wherein the one or more storage media further store instructions that, when executed on the one or more processors, cause the one or more processors to:
    acquire communication bandwidths regarding respective applications or communication services of each of the mobile terminals, and control the communication bandwidths on the basis of the acquired state information on the base stations and the acquired communication bandwidth regarding the respective applications or communication services of each of the mobile terminals.

5. The network system according to claim 4, wherein the one or more storage media further store instructions that, when executed on the one or more processors, cause the one or more processors to: the
    control the allocated communication bandwidths in response to the start of an application or communication service at one of the mobile terminals.

6. The network system according to claim 1, wherein the communication bandwidths allocated to a communication path for each of the mobile terminals are controlled in queue groups.

7. The network system according to claim 1,
    wherein the one or more storage media further store instructions that, when executed on the one or more processors, cause the one or more processors to:
    control a bandwidth allocated for each of the base stations.

8. The network system according to claim 7, wherein the one or more storage media further store instructions that, when executed on the one or more processors, cause the one or more processors to: control a bandwidth for each base station in a queue group.

* * * * *